United States Patent
Zwick

(10) Patent No.: US 7,980,741 B2
(45) Date of Patent: Jul. 19, 2011

(54) AUTOMOTIVE ILLUMINATION-SYSTEM DEVICE AND LIGHT-CONDUCTOR SYSTEM FOR AN AUTOMOTIVE ILLUMINATION-SYSTEM DEVICE

(75) Inventor: Hubert Zwick, Stuttgart (DE)

(73) Assignee: Automotive Lighting Reutlingen GmbH (DE)

( * ) Notice: Subject to any disclaimer, the term of this patent is extended or adjusted under 35 U.S.C. 154(b) by 306 days.

(21) Appl. No.: 12/407,600

(22) Filed: Mar. 19, 2009

(65) Prior Publication Data
US 2009/0237951 A1 Sep. 24, 2009

(30) Foreign Application Priority Data
Mar. 20, 2008 (DE) .......... 10 2008 015 131

(51) Int. Cl.
*F21V 9/00* (2006.01)

(52) U.S. Cl. ........ 362/511; 362/551; 362/560; 385/901; 385/146

(58) Field of Classification Search .......... 362/551, 362/555, 560, 511; 385/901, 146
See application file for complete search history.

(56) References Cited

U.S. PATENT DOCUMENTS

| | | | |
|---|---|---|---|
| 4,576,436 A | | 3/1986 | Daniel |
| 5,581,683 A | * | 12/1996 | Bertignoll et al. ............ 385/146 |
| 6,350,041 B1 | * | 2/2002 | Tarsa et al. ..................... 362/231 |
| 6,814,479 B2 | * | 11/2004 | Aynie et al. .................... 362/511 |
| 7,624,699 B2 | * | 12/2009 | Harada et al. ................. 116/286 |
| 2005/0030960 A1 | * | 2/2005 | Sumida et al. ................. 370/402 |
| 2010/0214803 A1 | * | 8/2010 | Sakamoto et al. ............ 362/612 |

FOREIGN PATENT DOCUMENTS

| | | |
|---|---|---|
| DE | 19943821 A1 | 3/2001 |
| DE | 102007016923 A1 | 9/2008 |
| JP | 2002108256 A * | 4/2002 |
| WO | 2004104476 A1 | 12/2004 |

* cited by examiner

*Primary Examiner* — Ali Alavi
(74) *Attorney, Agent, or Firm* — Donald R. Boys; Central Coast Patent Agency, Inc

(57) ABSTRACT

The invention relates to a light-conductor structure (13) for an automobile lighting device (11), with a coupling section (17) to couple light into the light-conductor structure, a curved reflecting surface (25) to reflect light beams (59) of the light coupled into the light-conductor structure via the coupling section, and at least one decoupling section (30, 45, 51) to decouple the light from the light-conductor structure (13). In order to achieve a light-conductor structure (13) in which fewer limitations to the determination of its geometric shape exist, or whose appearance may be more freely configured, it is proposed that the reflecting surface (25) of the light-conductor structure (13) is curved such that light reflected from the reflecting surface (25) strikes directly with no additional reflection either again onto the reflecting surface (25) or passes into the minimum of one decoupling section (30, 45, 51).

13 Claims, 3 Drawing Sheets

Figure 1:
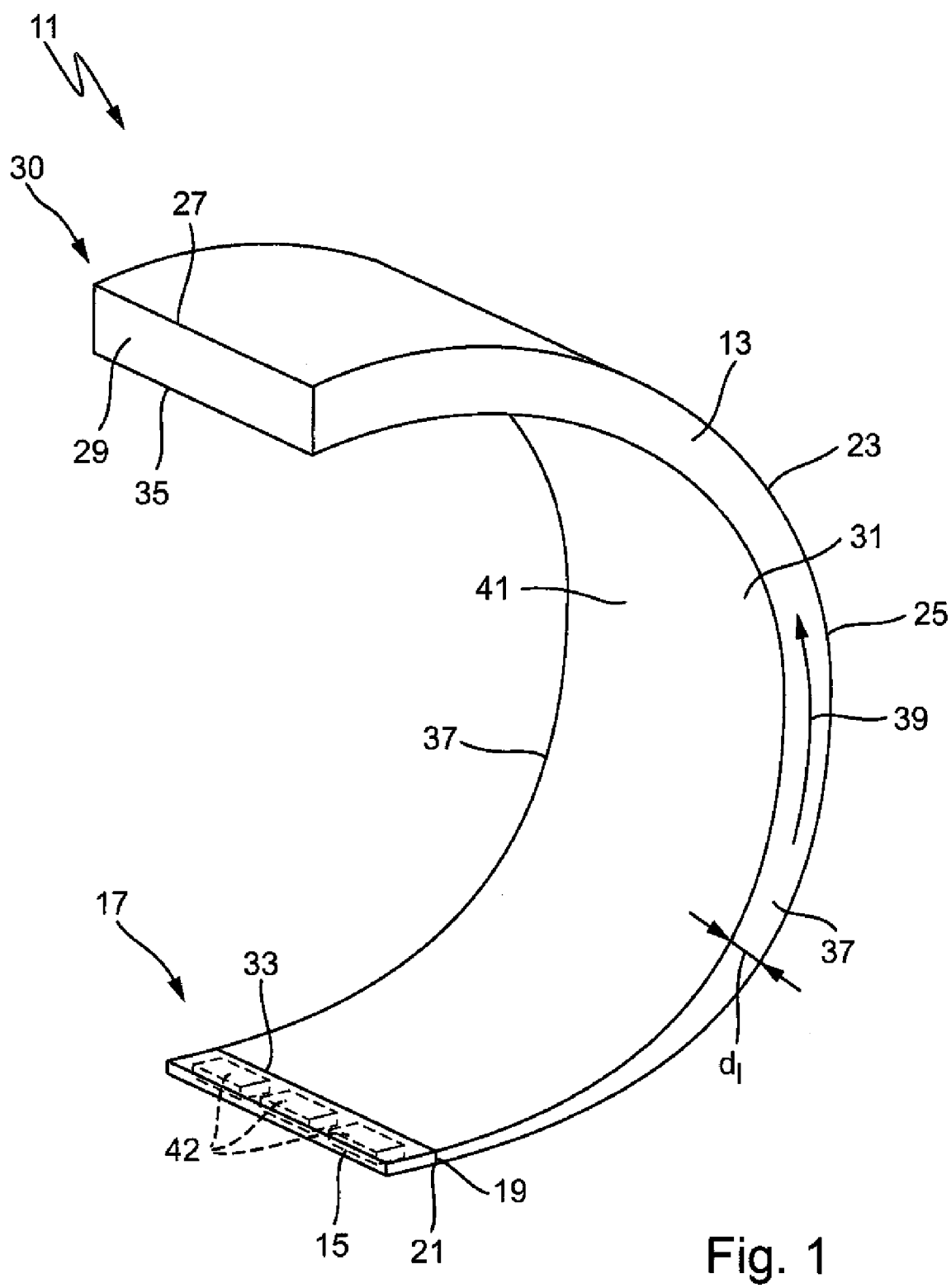

AUTOMOTIVE ILLUMINATION-SYSTEM DEVICE AND LIGHT-CONDUCTOR SYSTEM FOR AN AUTOMOTIVE ILLUMINATION-SYSTEM DEVICE

CROSS-REFERENCE TO RELATED DOCUMENTS

The present application claims priority to a German patent application serial number DE 10 2008 015 131.9, which was filed on Mar. 20, 2008, which is incorporated herein in its entirety, at least by reference.

DESCRIPTION

The invention relates to a light-conductor structure for an automobile lighting device, with a coupling indentation to couple light into the light-conductor structure, a curved reflecting surface to reflect light beams of the light coupled into the light-conductor structure via the coupling indentation, and at least one decoupling section to decouple the light from the light-conductor structure. The invention also relates to an automobile lighting device that includes such a light-conductor structure.

A lighting system for automobiles is known from DE 102 00 359 A1. This light conductor is flat, in the shape of a disk. The light conducing effect of this light conductor is based on the fact that the light coupled into the light conductor is reflected back and forth between opposing surfaces of the disk of the light conductor.

It is the task of the invention to provide a light-conductor structure in which fewer limitations exist during the establishment of their geometric shape and/or whose appearance may be configured more freely.

This task is solved by a light-conductor structure of the type mentioned at the outset that is characterized by the fact that the reflecting surface of the light-conductor structure is curved such that light reflected toward the reflecting surface strikes directly onto the reflecting surface without being reflected again, or at least enters one decoupling section. In contrast to existing light conductors with two opposing reflecting surfaces, the light-conductor structure based on the invention includes only one reflecting surface onto which, as a rule, the light is reflected several times in succession before it is decoupled. The curvature of the reflecting surface is also selected such that light that does not enter into the decoupling section is reflected exclusively at the reflecting surface of the light-conductor structure. For this, at least a portion of the light beams of the coupled light strikes the reflecting surface at an incident angle that is greater than the minimum angle of incidence for which an exit angle exists, at which the light reflected at the reflecting surface again strikes the reflecting surface or enters into the minimum of one decoupling section. For this, the angle of incidence and the angle of reflection are measured with respect to an orthogonal to the reflecting surface.

There is much design freedom here with regard to the exact configuration of the shape of the curved reflecting surface. For example, it may be provided that the cross section of the reflecting surface possesses the shape of a section of an ellipse.

Advantageously the light-conductor structure can possess a transparent body, whereby the reflecting surface corresponds to at least a section of a convex curved first surface of the transparent body.

For this, it is advantageous that the light-conductor structure be plate-shaped, whereby the light-conductor structure possesses a second surface that is advantageously curved to be concave and that extends alongside the reflecting surface. This results in a curved light-conductor structure, whereby the two surfaces form side surfaces of the plate-shaped light-conductor structure. The second surface of the light-conductor structure does not, in contrast to the reflecting surface, contribute to further conduction of the light within the light-conductor structure. Upon implementation of the light-conductor structure based on the invention, the second surface may therefore be largely free in shape.

It may be provided that the separation between the two surfaces is constant or diminishing at least in sections along the light-conduction direction. This means that the two surfaces may be parallel, or that, alternatively, the thickness of the light-conductor structure increases along the light-conduction direction. For this, the two surfaces may also be parallel at least in one section, and in another section, the separation between the two surfaces may increase along the light-conduction direction.

Depending on the configuration of the invention, the light-conductor structure may possess one or more decoupling sections. In an advantageous embodiment of the invention, it is provided that a first cross edge of the overall plate-shaped light-conductor structure forms a coupling surface of the light-conductor structure and/or a second cross edge of the light-conductor structure opposite the first cross edge forms a decoupling surface of the first decoupling section. In the case of a light-conductor structure whose thickness increases along the light-conduction direction, the surface area of the decoupling surface is greater than that of the coupling surface.

It is particularly advantageous for the coupling section to possess a supply light-conductor structure to bundle and conduct the light. This achieves the situation in which the light first striking the reflecting surface possesses a relatively large angle of incidence at the reflecting surface. This in turn increases the configuration free space when the light-conductor structure is realized, particularly the shape of the reflecting surface. For example, a larger curvature radius may be selected for at least a section of the reflecting surface, or a comparatively thin light-conductor structure may be provided.

It is further advantageous for non-transparent material to be mounted on at least sections of the second surface of the light-conductor structure, and/or that the second surface is coated at least in sections with such material. For example, the second surface may be coated with a non-light-conducting paint, advantageously with black paint. This coating particularly causes the result that the color of the light-conductor structure is determined by the non-transparent material for an observer observing the reflecting surface of the light-conductor structure. For example, black paint on the second surface will result in a light-conductor structure that appears black to the observer.

It may also be provided that the second surface of the light-conductor structure includes at least one securing element. This securing element may be formed as one piece with the rest of the light-conductor structure. Since the second surface does not contribute to further conduction of the light within the light-conductor structure, the securing element present on the second surface does not influence or detract from the light behavior of the light-conductor structure. By means of this securing element, the light-conductor structure may thus be simply and securely attached to other components of the automobile lighting device, such as to other components of the automobile headlamp or an automobile light.

In an advantageous embodiment example of the invention, the light-conductor structure possesses a second decoupling section that includes at least a first decoupling element to decouple the light form the light-conductor structure, whereby the first decupling element is mounted on the reflecting surface of the light-conductor structure. This may achieve the situation, for example, in which light is decoupled from the light-conductor structure by the reflecting surface.

As an alternative or supplement to this, it may be provided that the light-conductor structure includes a third decoupling section that possess at least a second decoupling element to decouple the light from the light-conductor structure, whereby the second decoupling element is mounted on the second surface of the light-conductor structure. The second decoupling element is advantageously configures such that the light decoupled from the light-conductor structure by the second decoupling element is given up laterally by means of the reflecting surface of the light-conductor structure.

It is advantageous for the light-conductor structure be formed of a thermoplastic, transparent plastic, preferably poly-methyl methacrylate. The light-conductor structure may be formed of several pieces of transparent plastic, but it is advantageous for the light-conductor structure to be of one piece. The light-conductor structure may be manufactured using an injection-molding process.

As an alternative to the solution to the task given above, an automobile lighting device may be proposed with a light-conductor structure whereby the light-conductor structure possesses a coupling section to couple light into the light-conductor structure, a curved reflecting surface to reflect light beams of the light coupled into the light-conductor structure via the coupling section, and at least one decoupling section to decouple the light from the light-conductor structure characterized in that the light-conductor structure is a light-conductor structure based on the invention. The automobile lighting device may be an automobile headlight or automobile light, particularly a taillight.

Figure 2:
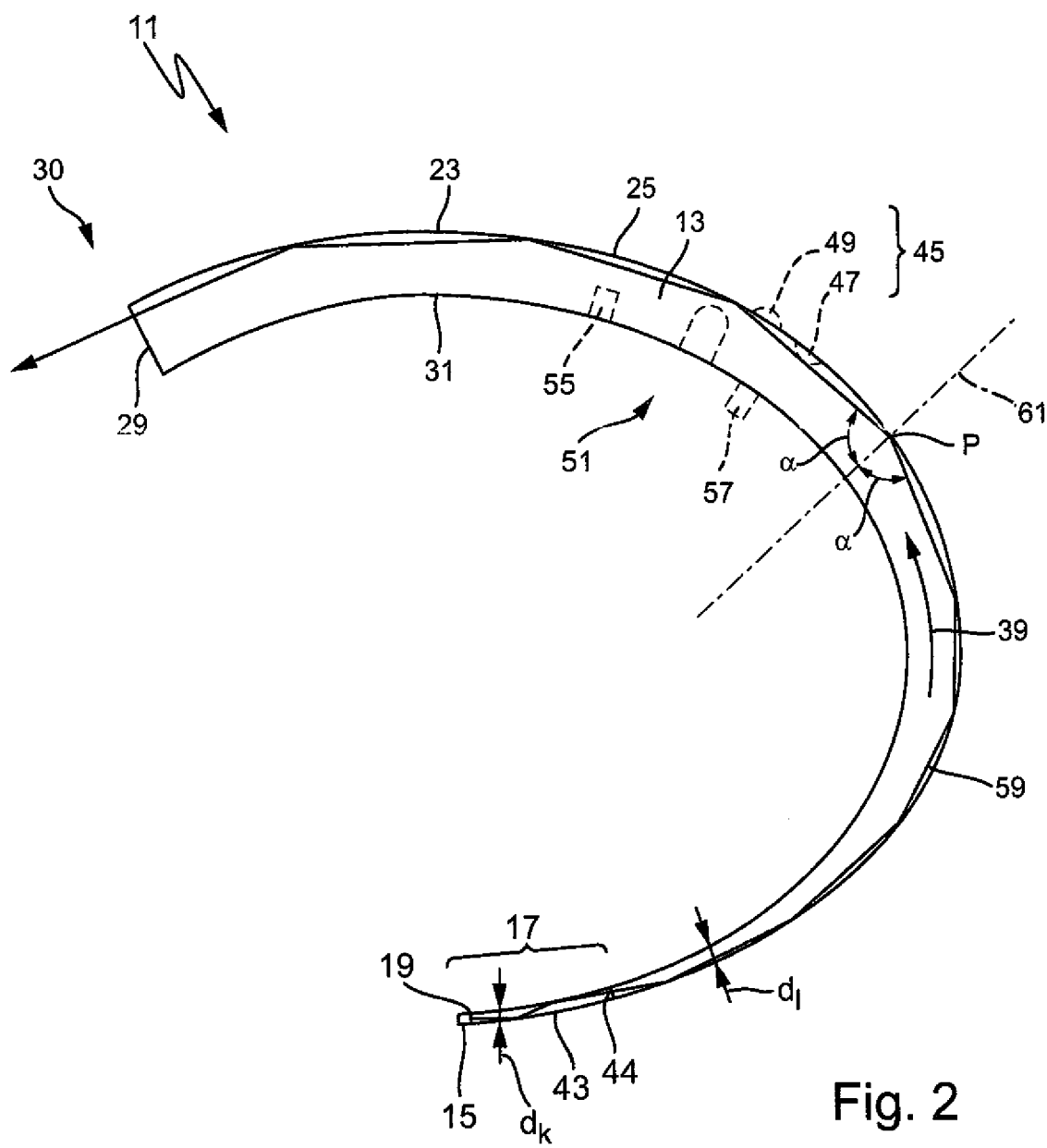
Figure 3:
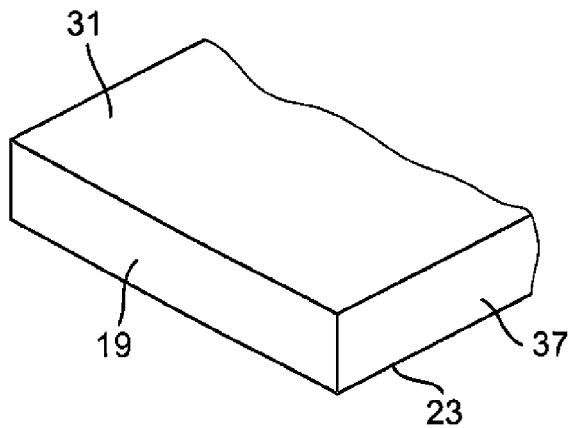
Figure 4:
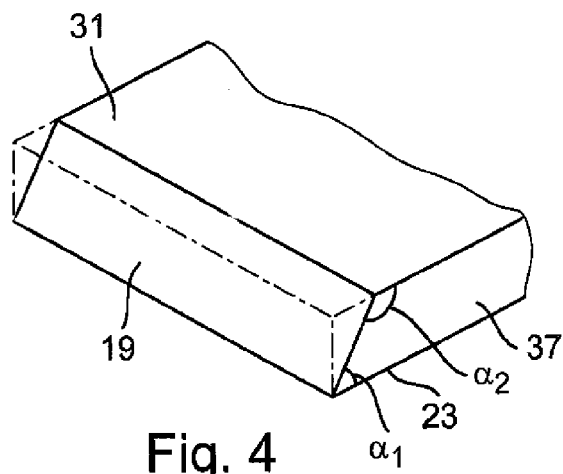
Figure 5:
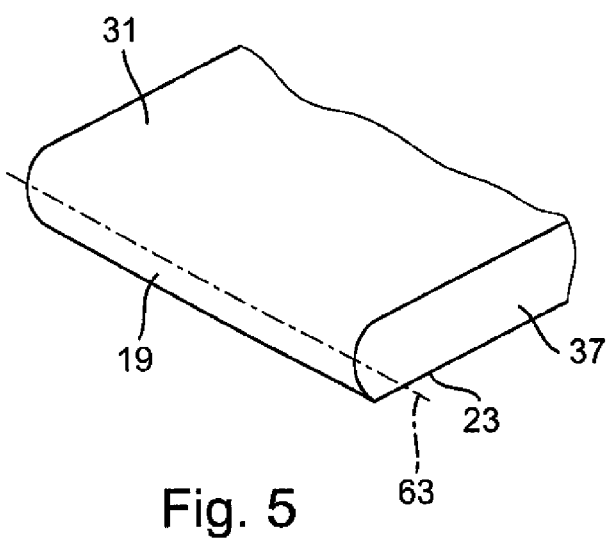
Figure 6:
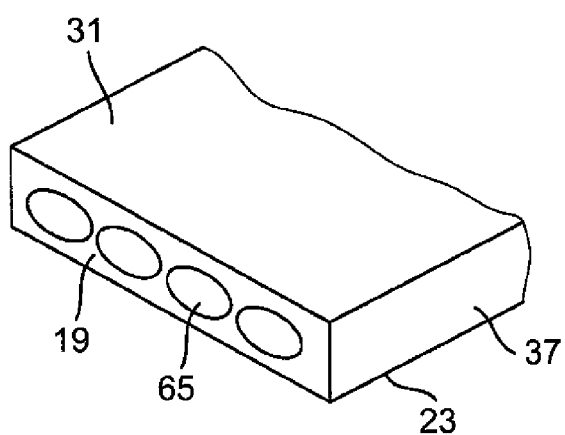

Additional advantages and properties of the invention may be taken from the following description, in which advantageous embodiments of the invention are described in greater detail using Figures, which show:

FIG. 1 an automobile lighting device with a light-conductor structure based on a first advantageous embodiment;

FIG. 2 lateral view of an automobile lighting device with a light-conductor structure based on a second advantageous embodiment;

FIG. 3 coupling surface of the light-conductor structure from FIG. 2;

FIG. 4 coupling surface of a light-conductor structure of an automobile lighting device per a third advantageous embodiment;

FIG. 5 coupling surface of a light-conductor structure of an automobile lighting device per a fourth advantageous embodiment;

FIG. 6 coupling surface of a light-conductor structure of an automobile lighting device per a fifth advantageous embodiment.

FIG. 1 shows an automobile lighting device 11 with a light-conductor structure 13 and a light source 15. The light-conductor structure 13 includes a coupling section 17 with a coupling surface 19. A first cross edge 21 of a convex curved first surface 23 of the light-conductor structure 13 forms a lower longitudinal side of the overall rectangular coupling surface 19. At least a portion of the first surface 23 corresponds to a reflecting surface 25 of the light-conductor structure 13. The reflecting surface 25 may possess the cross-sectional shape of a section of an ellipse. A radius of a curve of the reflecting surface 25 may diminish along the light-conduction direction (arrow 39).

A second cross edge 27 of the first surface 23 forms the upper longitudinal side of the overall rectangular decoupling surface 29 of a first decoupling section 30 of the light-conductor structure 13. A second surface 31 of the light-conductor structure 13 extends along with the first surface 23 of the light-conducting structure 13, whereby a first cross edge 33 of the second surface 31 corresponds to an upper longitudinal side of the coupling surface 19, and a second cross edge 35 of the second surface 31 forms a lower longitudinal side of the decoupling surface 29. The light-conductor structure 13 is concave on the second surface 31.

The light-conductor structure 13 is limited by two lateral surfaces 37 that extend perpendicular to the two surfaces 23, 31, as well as by the two surfaces 23, 31. One width of the lateral surfaces 37 increases along the light-conduction direction 39 so that a separation $d_1$ between the two surfaces 23, 31 increases along the light-conduction direction. The two lateral surfaces 37 are of the same shape and are mounted in parallel to each other so that the light-conductor structure 13 has the overall shape of a curved plate whose thickness $d_1$ increases along the light-conduction direction. The coupling surface 19 and the decoupling surface 29 correspond to the two opposing cross edges of this plate. Accordingly, the decoupling surface 29 of the first decoupling section 30 possesses a greater surface area than does the coupling surface 10 of the coupling section 17.

A coat of black paint 41 is applied to the second surface 31. In one embodiment example (not shown), the second surface 31 is not painted, but rather covered with an adhesive film of black (non-transparent) material. In another embodiment example, the light-conductor structure 13 is sprayed with a non-transparent material on its second surface 31. Instead of black material, non-transparent materials of a different color may be used. Optical surface structures to influence the appearance of the light-conductor structure 13 may be positioned on the second surface 31. These optical surface structures influence the light conducted through the light-conductor structure 13 very little, or not at all.

The light source 15 of the lighting device 11 is mounted on the coupling surface 19 of the light-conductor structure 13. The light source 15 includes Light-Emitting Diodes (LED's). The invention may, however, be used in connection with light sources 15 that use other means such as an incandescent lamp instead of LED's 42 to generate light. In the embodiment example shown in FIG. 1, the light source 15 is separated from the light-conductor structure 13. The light source 15 may, however, be formed as an integral component of the light-conductor structure 13.

The lighting device 11 shown in FIG. 2 based on the second embodiment example is distinguished from the first embodiment example of the lighting device 11 based on the invention particularly in that the coupling section 17 includes a second supply light-conductor structure 43 that is mounted along the light-conduction direction 39 before an intermediate surface 44 of the light-conductor structure 13. The supply light-conductor structure 43 is flat and plate-shaped, like the rest of the light-conductor structure 13, and, along with the rest of the light-conductor structure 13, it forms a single transparent manufactured part made of poly-methyl methacrylate (PMMA, Plexiglass), polycarbonate, or some other transparent (preferably clear as glass) material. In the embodiment example shown in FIG. 2, the first surface 23, the reflecting surface 25 formed from the first surface 23, and the second surface 31 extend between the intermediate surface 44 and the decoupling surface 29.

The longitudinal sides (without reference indices) of the supply light-conductor structure 43 are mounted adjacent to one another, and possess a separation of $d_k$ at least outside the intermediate surface 44 that is less than the separation $d_1$ of the two surfaces 23, 31 at the intermediate surface 44. The separation $d_k$ of the two longitudinal sides may increase linearly along the light-conduction direction 39 so that the separation $d_k$ of the two longitudinal sides from the intermediate surface 44 corresponds to the separation $d_1$ of the surfaces 23, 31 from the intermediate surface 44.

Further, the light-conductor structure 13 includes a second decoupling surface 45 on its reflecting surface 25 that includes first decoupling elements in the form of impressions 47 and/or projections 49. Further, the light-conductor structure 13 includes a third decoupling section 51 that includes second decoupling elements in the form of recesses 53 in the second surface 31. Depending on accurate configuration of the light-conductor structure 13, the second decoupling section 45, the third decoupling section 51, or both decoupling sections 45, 51 may be provided. As needed, the first decoupling elements may be formed only of impressions 47 or only of projections 49, or, as FIG. 2 shows, impressions 47 and projections 49 may be combined. For the sake of clarity, FIG. 1 shows only one impression 47, one projection 49, and one recess 53.

Further, the second surface 31 of the light-conductor structure 13 includes securing elements formed as blind holes 55 in the light-conductor structure 13 that begin at the second surface 31. Also, securing elements are provided in the form of studs 57 projecting from the second surface 31. The light-conductor structure 13 is secured to other components (not shown) of the lighting device 11 by means of securing elements 45, 57.

When the automobile lighting device 11 is used, light generated by the light source 15 (shown in FIG. 2 as a light beam 59) is coupled into the supply light-conductor structure 43 by means of the coupling surface 19. If, as in the embodiment example shown, the thickness $d_k$ of the supply light-conductor structure 43 increases along the light-conduction direction, the supply light-conductor structure 43 bundles the light 59 and conducts it with relatively low angle of incidence to the intermediate surface 44. The supply light-conductor structure 43 functions as a conventional light conductor, i.e., the light 59 is reflected on both side surfaces of the supply light-conductor structure 43.

In the area of the light-conductor structure 13 between the two surfaces 23 and 31 (in the second embodiment example, in the area after the intermediate surface 44 along the light-conduction direction), the light 59 will be exclusively reflected at the reflecting surface 25 unless it is decoupled from the light-conductor structure 13. As soon as it has been reflected from the reflecting surface 25, the light 59 is either reflected again from the reflection surface 25 or conducted to one of the decoupling sections 30, 45, 51. In particular, the light 59 is not reflected at the second surface 31 for the purpose of further light conduction within the light-conductor structure 13. The light beam 59 adapts itself to the reflecting surface 25, is conducted along the light-conduction direction through at least one section of the light-conductor structure 13, and is decoupled from the light-conductor structure 13 via the decoupling surface 29 of the first decoupling section 30, via the first decoupling elements 47, 49 of the second decoupling section 45, or via the second decoupling elements 53 of the third decoupling section 51.

If the second decoupling section 30 is present within the light-conductor structure 13, then at each impression 47 or projection 49, light 59 is decoupled from the light-conductor structure 13 in that it is diffracted at the impression 47 or projection 49 and directed laterally away from the reflecting surface 25 (in FIG. 2, to the right or upward). If the third decoupling section 51 is present, then the light 59 is reflected at each impression 53 toward the reflecting surface 25. However, the light 59 reflected from the impressions 53 strikes the reflecting surface 25 at an angle of incidence that is less than its limiting angle of total reflection, so that the light 59 reflected at the impression 53 passes through the reflecting surface 25 and is decoupled from the light-conductor structure 13. The impressions 53 extend deeply enough into the light-conductor structure 13 so that they are irradiated from the light 59 that is guided along the reflecting surface 25. Since the second surface 31 is coated with black paint, the observer viewing the reflecting surface 25 perceives an overall black surface that has a point of light at every point where a decoupling element 47, 49, 53 is located.

The curvature of the reflecting surface 25 is selected such that the light, i.e., the light beam 59, exits to the reflecting surface 25 at an angle $\alpha$ that is greater than the limiting angle of total reflection between the material of the light-conductor structure 13 (preferably PMMA) and the environment (usually air). For this, the angle of incidence a of the light beam 59 is measured with respect to a perpendicular 61 to the reflecting surface 25 at a strike point P of the light beam 59 at the reflecting surface 25.

The shape of the coupling surface 19 may be adjusted to the irradiation characteristics of the light source 15. In the first and the second embodiment example, the coupling surface 19, as FIG. 3 shows, is mounted at least essentially perpendicular to the first surface 23 or to the second surface 31 of the light-conductor structure 13.

Deviating from this, in a third embodiment example shown in FIG. 4, the coupling surface 19 is curved inward with respect to the surfaces 23, 31 such that an angle $\alpha_1$ between the coupling surface 19 and the first surface 23 is smaller than the angle $\alpha_2$ between the coupling surface 19 and the second surface 31. When this embodiment example of the automobile lighting device is operated, at least a portion of the light 59 is diverted toward the first surface 23, i.e., toward the reflecting surface 25 upon coupling of the light 59.

According to the fourth embodiment example shown in FIG. 5, the coupling surface 19 is convex. It possesses the shape of a cutout from a cylindrical coat of a circular cylinder. Alternatively, it may also be provided that the coupling surface is transparent or hyperbola-shaped at least in sections. A crown 63 of the coupling surface 19 extends parallel to the two surfaces 23, 31. This crown 63 may be positioned between the two surfaces 23, 31 such that a separation of the crown 63 from the first surface 23 matches, or is less than, the separation of the crown 63 to the second surface 31. Instead of the convex coupling surface 19 shown in FIG. 5, a concave coupling surface 19 may also be provided whose shape is complementary to the shape of the shown convex coupling surface 19.

The coupling surface 19 may include optical elements to influence the light 59 to be coupled. For example, a fifth embodiment example possesses optical elements realized as convex projections 65 (see FIG. 6). The shape of these projections 65 may be matched to the irradiation properties of the light source 15. The surfaces of the projections 65 may be in the shape of a sphere, a torus, or any other shape. Instead of the convex projections 65, matching concave impressions may be provided. It may also be provided that a portion of the optical elements are implemented as projections 65, and another portion of the optical elements are implemented as impressions. In the fifth embodiment example shown in FIG.

6, the coupling surface 19 outside the projections [6]5 is, similarly to FIG. 3, perpendicular to the two surfaces 23, 31. However, the inclined coupling surfaces shown in FIG. 4, the convex-curved coupling 14 also shown in FIG. 4, and the concave-shaped coupling surface may include convex and/or concave optical elements.

In general, the convex coupling surface 19 and/or the convex optical elements in the form of projections 65 are well suited for an automobile lighting device 11 whose light source 15 gives off a strongly-diverging light bundle. In this case, the coupling surface 19 and/or the projections 65 collect the light 59 irradiated from the light source 15. In the case of a light source 15 that irradiates a convergent light bundle, the concave coupling surface 19 and/or the impressions may be provided that provide for an essentially parallel beam path, at least in an area lying behind the coupling surface 19 along the light-conduction direction.

In another embodiment example (not shown), the reflecting surface 25 is curved not only along the light-conduction direction, but also along a direction diverging from the direction of light conduction 39, preferably along a direction perpendicular to the direction of light conduction 39 such that the reflecting surface 25 reflects at least a portion of the light beams 59 that is inclined to the plane of the direction of light conduction 39 so that it strikes directly without further reflection either on the reflecting surface 25, or are decoupled by means of one of the decoupling surfaces 30, 45, 51 out of the light-conductor structure 13. That means that a cross section perpendicular to the plane of the drawing of FIG. 2 is, a curved line, in contrast to that in the shown embodiment example. The reflecting surface 25 may be curved such that the light-conductor structure 13 possesses a convex shape at the reflecting surface 25.

Since the second surface 31 does not contribute to light conduction, it may be freely shaped for other purposes. For example, the securing devices 55, 57 described above may be provided on the second surface 31, or opaque material, particularly paint, may be applied to the reflecting surface 25 without negatively influencing the light-transmission characteristics of the light-conductor structure 13. This provides additional configuration options for the automobile lighting device 11.

The invention claimed is:

1. Light-conductor structure for an automobile lighting device, the light-conductor structure comprising a coupling section adapted to allow light to be coupled into the light-conductor structure, a curved reflecting surface to reflect light beams of the light coupled into the light-conductor structure via said coupling section, and at least one decoupling section adapted to allow light to be decoupled from the light-conductor structure,
   characterized in that the reflecting surface of the light-conductor structure is curved such that light reflected from the reflecting surface passes directly without further reflection from surfaces of the light-conductor structure other than the reflecting surface either back to the reflecting surface or into at least one of said decoupling sections.

2. Light-conductor structure as in claim 1, characterized in that the reflecting surface possess the cross-sectional shape of a segment of an ellipse.

3. Light-conductor structure as in claim 2, characterized in that the light-conductor structure comprises a transparent body, whereby the reflecting surface corresponds to at least a segment of a convex-curved first surface of the transparent body.

4. Light-conductor structure as in claim 3, characterized in that the light-conductor structure is plate-shaped, whereby the light-conductor structure includes a second concave-curved surface extending alongside the reflecting surface.

5. Light-conductor structure as in claim 4, characterized in that the two curved surfaces extend on opposite surfaces of the light-conductor structure and that a distance between the two curved surfaces is constant or diminishes along the light-conduction direction of the light-conductor structure.

6. Light-conductor structure as in claim 5, characterized in that a first face surface of the light-conductor structure-forms a coupling surface of said coupling section of the light-conductor structure, and that a second face surface of the light-conductor structure-opposite to the first face surface forms a decoupling surface of a first decoupling section.

7. Light-conductor structure as in claim 6, characterized in that the coupling section includes a supply light-conductor structure to bundle and guide light emitted by a light source to said coupling section.

8. Light-conductor structure as in claim 7, characterized in that non-transparent material is applied to at least sections of the second curved surface of the light-conductor structure, or the second curved surface is at least partially coated with non-transparent material.

9. Light-conductor structure as in claim 4, characterized in that the second curved surface of the light-conductor structure includes at least one attachment element.

10. Light-conductor structure as in claim 6, characterized in that the light-conductor structure includes a second decoupling section comprising at least a first decoupling element to decouple light from the light-conductor structure, whereby the first decoupling element is mounted on the reflecting surface of the light-conductor structure.

11. Light-conductor structure as in claim 10, characterized in that the light-conductor structure includes a third decoupling section comprising at least a second decoupling element to decouple the light from the light-conductor structure, whereby the second decoupling element is mounted on the second curved surface of the light-conductor structure.

12. Light-conductor structure as in claim 1, characterized in that the light-conductor structure is formed of a thermoplastic and transparent plastic, preferably poly-methyl methacrylate.

13. Automobile lighting device with a light-conductor structure, whereby the light-conductor structure includes a coupling section adapted to allow light to be coupled into the light-conductor structure, a curved reflecting surface to reflect light beams of the light coupled into the light-conductor structure via said coupling section, and at least one decoupling section adapted to allow light to be decoupled from the light-conductor structure,
   characterized in that the light-conductor structure is a light-conductor structure according to one of the prior claims.

* * * * *